US 12,499,774 B2
Dec. 16, 2025

(12) United States Patent
Zhao et al.

(10) Patent No.: US 12,499,774 B2
(45) Date of Patent: Dec. 16, 2025

(54) METHOD AND APPARATUS FOR UAV AND UAV CONTROLLER GROUP MEMBERSHIP UPDATE (71) Applicant: Tencent America LLC, Palo Alto, CA (US)

(72) Inventors: Shuai Zhao, Pleasanton, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 144 days.

(21) Appl. No.: 17/746,783

(22) Filed: May 17, 2022

(65) Prior Publication Data
US 2022/0371732 A1 Nov. 24, 2022

Related U.S. Application Data

(60) Provisional application No. 63/190,666, filed on May 19, 2021.

(51) Int. Cl.
*G05D 1/00* (2024.01)
*G08G 5/55* (2025.01)
*G08G 5/57* (2025.01)

(52) U.S. Cl.
CPC .............. *G08G 5/55* (2025.01); *G05D 1/104* (2013.01); *G08G 5/57* (2025.01); *B64U 2201/00* (2023.01)

(58) Field of Classification Search
CPC ..... B64C 39/024; G08G 5/0069; B64U 30/20
See application file for complete search history.

(56) References Cited

U.S. PATENT DOCUMENTS 10,594,595 B2   3/2020  Boucadair et al.
10,866,596 B1  12/2020  Shattil
(Continued)

FOREIGN PATENT DOCUMENTS

WO   2013/188629 A2  12/2013
WO   2020/1010388 A1  5/2020
(Continued)

OTHER PUBLICATIONS

"3GPP TR 23.755 V 17.0.0 3rd Generation Partnership Project; Technical Specification Group Services and System Aspects; Application layer for Unmanned Aerial Systems (UAS) . . . " 3GPP; Apr. 2021 (Year: 2021).*

(Continued)

*Primary Examiner* — Helal A Algahaim
*Assistant Examiner* — Karen Lynelle Furgason
(74) *Attorney, Agent, or Firm* — Sughrue Mion, PLLC (57) ABSTRACT

In the method, an unmanned aerial system application enabler (UAE) server can determine that a first UAV (UAV-1) is to be replaced with a second UAV (UAV-2) based on a received request. The UAV-2 is recognized by the UAE server based on a Civil Aviation Authority (CAA) level identity (ID) of the UAV-2. A request to perform a group membership update is sent by the UAE server to a SEAL group management (GM) server. The group membership update replaces the UAV-1 with the UAV-2. A response message is received by the UAE server from the SEAL GM server. The request to perform the group membership update includes (i) an ID of an UAE client that corresponds to the group of the UAV-1 and the UAV-C, (ii) a user equipment (UE) ID of the UAV-1, (iii) a UE ID of the UAV-2, and (iv) the CAA-level ID of the UAV-2.

20 Claims, 9 Drawing Sheets

(56) References Cited

U.S. PATENT DOCUMENTS

| | | | | |
|---|---|---|---|---|
| 2006/0056345 | A1* | 3/2006 | Marinier | H04B 7/0408 370/339 |
| 2014/0073347 | A1* | 3/2014 | Yongjin | H04W 64/00 455/456.1 |
| 2015/0163122 | A1* | 6/2015 | Granshaw | H04L 51/063 709/224 |
| 2019/0028182 | A1* | 1/2019 | Smyth | H04W 24/08 |
| 2019/0029075 | A1* | 1/2019 | Wang | H04L 63/0876 |

FOREIGN PATENT DOCUMENTS

| | | | | |
|---|---|---|---|---|
| WO | 2020/163760 | A2 | 8/2020 | |
| WO | WO-2021016629 | A2 * | 1/2021 | G08G 5/0013 |
| WO | 2021/041143 | A1 | 3/2021 | |

OTHER PUBLICATIONS

"3GPP TR 23.434 V 17.1.0 3rd Generation Partnership Project; Technical Specification Group Services and System Aspects; Service Enabler Architecture Layer for Verticals (SEAL) . . . " 3GPP; Apr. 2021 (Year: 2021).*

"3GPP TR 23.255 V 0.4.0 3rd Generation Partnership Project; Technical Specification Group Services and System Aspects; Application layer for Unmanned Aerial Systems (UAS) . . . " 3GPP; Apr. 2021 (Year: 2021).*

Supplementary European Search Report issued Aug. 3, 2023 in Application No. 22789147.0 (13 pages).

Tencent: "Support for UAS identification usage in application layer architecture", 3GPP Draft; S6-211148, 3rd Generation Partnership Project (3GPP), Mobile Competence Centre ; 650, Route Des Lucioles ; F-06921 Sophia-Antipolis Cedex ; France, vol. SA WG6, No. e-meeting; May 24, 2021-Jun. 2, 2021, May 19, 2021.

"3rd Generation Partnership Project; Technical Specification Group Services and System Aspects; Study on application layer support for Unmanned Aerial Systems (UAS); (Release 17) ", 3GPP Standard; Technical Report; 3GPP TR 23.755, 3rd Generation Partnership Project (3GPP), Mobile Competence Centre ; 650, Route Des Lucioles ; F-06921 Sophia-Antipolis Cedex ; France, vol. SA WG6, No. V17.0.0, (Apr. 1, 2021), pp. 1-66.

"3rd Generation Partnership Project; Technical Specification Group Services and System Aspects; Service Enabler Architecture Layer for Verticals (SEAL); Functional architecture and information flows; (Release 17)" , 3GPP Standard; Technical Specification; 3GPP TS 23.434, 3rd Generation Partnership Project (3GPP), Mobile Competence Centre ; 650, Route Des Lucioles ; F-06921 Sophia-Antipolis Cedex ; France, vol. SA WG6, No. V17.1.0, (Apr. 2, 2021), pp. 1-132.

"3rd Generation Partnership Project; Technical Specification Group Services and System Aspects; Application layer support for Unmanned Aerial System (UAS); Functional architecture and information flows; (Release 17) " , 3GPP Standard; Technical Specification; 3GPP TS 23.255, 3rd Generation Partnership Project (3GPP), Mobile Competence Centre ; 650, Route Des Lucioles ; F-06921 Sophia-Antipolis Cedex ; France, vol. SA WG6, No. V0.4.0,(Apr. 26, 2021), pp. 1-33.

International Search Report dated Jul. 22, 2022 in Application No. PCT/US22/72414.

Written Opinion dated Jul. 22, 2022 of the International Searching Authority in Application No. PCT/US22/72414.

Written Opinion dated Mar. 28, 2025, issued by the Intellectual Property Office of Singapore in Application No. 11202254243F.

Invitation to Respond to Written Opinion dated Mar. 28, 2025, issued by the Intellectual Property Office of Singapore in Application No. 11202254243F.

* cited by examiner

METHOD AND APPARATUS FOR UAV AND UAV CONTROLLER GROUP MEMBERSHIP UPDATE

INCORPORATION BY REFERENCE

This present disclosure claims the benefit of priority to U.S. Provisional Application No. 63/190,666, "Unmanned Aerial System Communication" filed on May 19, 2021, which is incorporated by reference herein in its entirety.

TECHNICAL FIELD

The present disclosure relates to unmanned aerial system communication.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An unmanned aerial vehicle (UAV), or uncrewed aerial vehicle, can include an aircraft without any human pilot, crew, or passengers on board. UAVs are a component of an unmanned aircraft (or aerial) system (UAS). The UAS can further include a ground-based controller and a system of communications with the UAV. A communication system to support the connectivity needs of unmanned aircraft systems is under development.

SUMMARY

Aspects of the disclosure provide methods and apparatuses for managing an unmanned aerial vehicle (UAV) identification to maintain network service continuity. In some examples, an apparatus for managing the UAV identification includes receiving circuitry and processing circuitry.

According to an aspect of the disclosure, a method of UAV replacement in a service enabler architecture layer (SEAL) architecture is provided. In the method, an unmanned aerial system application enabler (UAE) server can determine that a first UAV (UAV-1) is to be replaced with a second UAV (UAV-2) based on a received request. The UAV-2 can be recognized by the UAE server based on a Civil Aviation Authority (CAA) level identity (ID) of the UAV-2, where the UAV-1 can be grouped with a UAV controller (UAV-C). A request to perform a group membership update can be sent by the UAE server to a SEAL group management (GM) server of the SEAL architecture. The group membership update can replace the UAV-1 with the UAV-2. A response message can further be received by the UAE server from the SEAL GM server. The request to perform the group membership update can include (i) an ID of an UAE client, where the UAE client can correspond to the group of the UAV-1 and the UAV-C, (ii) a user equipment (UE) ID of the UAV-1, (iii) a UE ID of the UAV-2, and (iv) the CAA-level ID of the UAV-2.

In some embodiments, the request to perform the group membership update further can include a timeout period that defines a waiting time limit for the response message from the SEAL GM server.

In the method, another request to perform the group membership update can be transmitted by the UAE server to the SEAL GM server when the response message is not received within the timeout period.

In some embodiments, the response message can include a group membership update result that indicates whether the group is successfully updated to include the UAV-2 and the UAV-C.

In the method, based on the group being successfully updated to include the UAV-2 and the UAV-C, an updated group ID for the UAV-2 and the UAV-C can be received by the UAE server from the SEAL GM server.

In some embodiments, the UAV-1 and the UAV-C can be assigned with an initial group ID by the SEAL GM server before the UAV-1 is replaced by the UAV-2.

In the method, Quality of service (QoS) management can be performed by the UAE server for the UAV-2 and UAV-C based on the updated group ID.

In some embodiments, the UAV-C, the UAV-1, and the UAV-2 can be registered with a 3rd Generation Partnership Project (3GPP) network, where the UE ID of the UAV-1 can include a first 3GPP UE ID, and the UE ID of the UAV-2 can include a second 3GPP UE ID.

In some embodiments, the request to perform the group membership update further can include a 3GPP UE ID of the UAV-C.

According to another aspect of the disclosure, an apparatus is provided. The apparatus has processing circuitry. The processing circuitry can be configured to perform any of the methods mentioned above.

Aspects of the disclosure also provide a non-transitory computer-readable medium storing instructions which when executed by a computer cause the computer to perform any of the methods mentioned above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
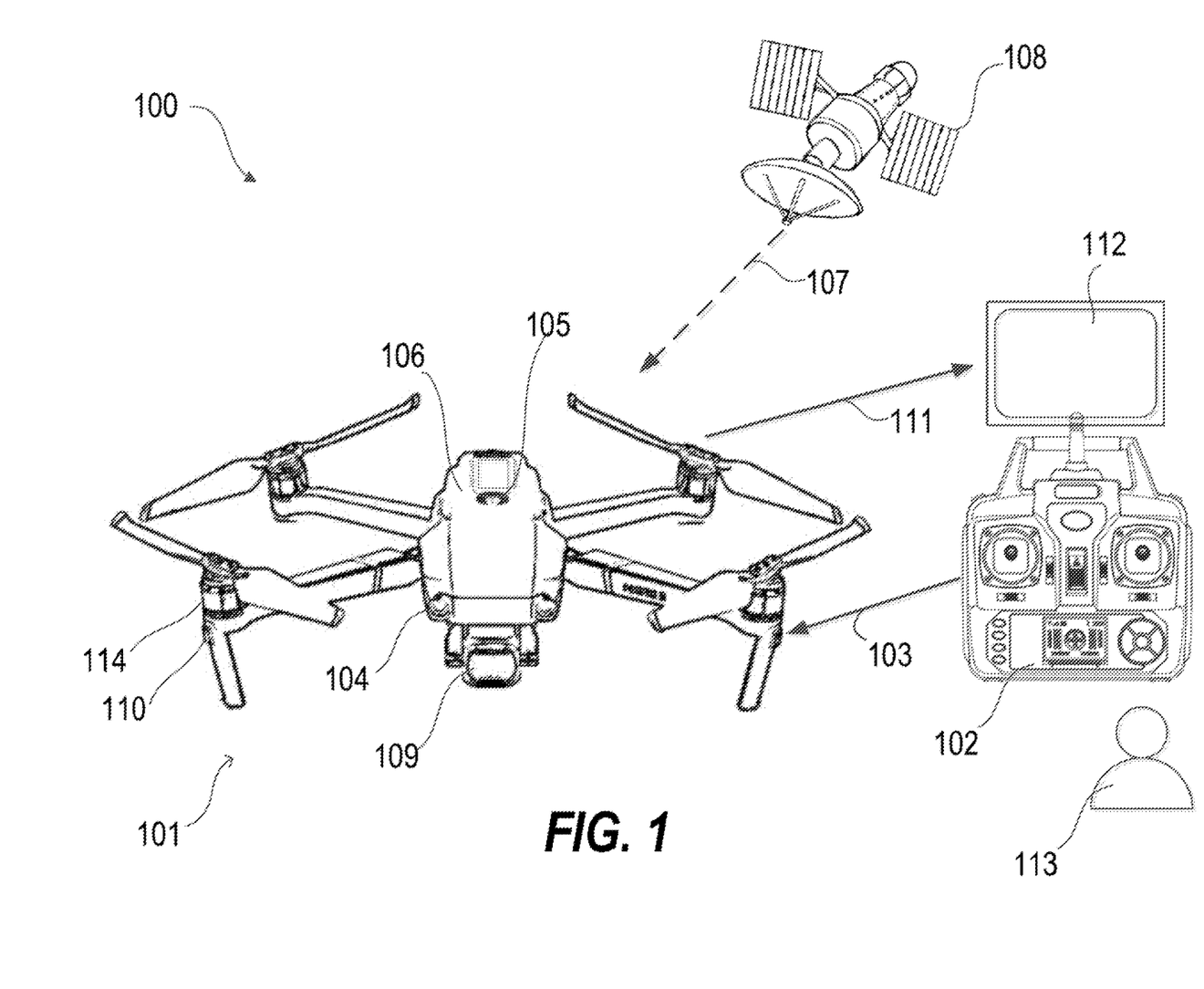
FIG. 1 is a schematic illustration of an Unmanned Aerial System (100) in accordance with an embodiment.

Referring to FIG. 1, an unmanned aerial system (UAS) (100) can include an unmanned aerial vehicle (UAV) (101) and a controller (102). The controller (102) can use a data link (103) to communicate control commands from the controller (102) to the UAV (101). The controller (102) may include at least one communication circuit that is configured to provide communication, through the data link (103), via very high frequency (VHF) and/or ultra-high frequency (UHF), and/or other wireless technology capable of analog and/or digital radio communications. The controller (102) may control power levels of the propulsion unit (114), such as one or more motors and/or engines, of the UAV (101) and/or the control surfaces of a model aircraft (not depicted). More abstract commands like pitch, yaw, and roll, similar to those of helicopters and/or aircrafts can also be used. An experienced pilot can operate the UAV (101) with basic controls, not relying on advanced onboard processing of control signals inside the UAV (101). The UAV (101) can be in a form of a helicopter and/or any other aircraft.

Advances in onboard electronic designs allow the offloading of certain tasks from the human operator (or user) 113 to the UAV (101) itself. Many UAVs, such as the UAV (101), can include sensor(s) (104) that are coupled to an onboard control circuitry (105) for sensing the attitude as well as the acceleration of the UAV (101). The onboard control circuitry (105) can be a computer system with a scaled-down and/or non-existent user interface. The information obtained by the sensor(s) (104), in addition to the control inputs received from the data link (103) from the controller (102), allows the UAV (10) to remain stable unless a positive control input is obtained from the controller (102).

The UAV (101) can include a receiver (106) for one of the Global Navigation Satellite Systems (GNSS), such as the Global Positioning System (GPS) operated by the United States. FIG. 1 illustrates a single satellite (108) that can provide a communication signal (107), to represent a GNSS. However, the receiver (106) of the UAV (101) may receive communication from a GNSS that includes three or more, and typically four or more, line-of-sight satellites to triangulate the position of the UAV (101) in space. A GNSS receiver, such as the receiver (106), can determine with fair accuracy the position of the UAV (101) in space and time. In the UAV (101), the GNSS can be augmented by additional sensors (e.g., an ultrasonic and/or lidar sensor) of the UAV (101) on the, in many cases, most critical vertical (e.g., Z) axis to enable soft landings (not depicted). The UAV (101) including GNSS capability can offer the user "fly home" and "auto-land" features. Thus, the UAV (101), upon a simple command from the controller (102) (e.g., the push of a single button), or in case of a lost data link (103) from the controller or other timeout of meaningful control input, can fly to a location that was defined as a home location.

The UAV (101) can also include one or more cameras (109). In some cases, the UAV (101) can include a gimbal-mounted camera as one of the cameras (109). The gimbal-mounted camera can be used to record pictures and/or a video of a quality sufficient for the user (113) of the UAV (101), such as in high definition television resolution. The UAV (101) can include other cameras (110) for covering some or all axis of movement. Onboard signal processing based on signals of the other cameras (110) can be used to prevent the UAV (101) from colliding with both fixed and moving objects.

In some cases, the UAV (101) can include a "main" camera as one of the cameras (109). The signal of the "main" camera can be communicated via the data link (111) in real-time towards the human user (e.g., the user (113)), and displayed on a display device (112) included in, attached to, and/or separate from the controller (102). The data link (111) may be the same or different from the data link (103). Accordingly, the UAV (101) may be successfully flown out of line of sight of a human pilot, using a technique known as "First Person View" (FPV).

As a result of the technical developments, UAVs, such as the UAV (101), have become considerably easier to fly, which in turn has made them popular not only with professional UAV pilots and determined and affluent hobbyists, but also the general public. As a result, millions of UAV are now sold every year compared to a few thousand-if that many-model helicopters that were sold about 15 years ago. At the same time, the knowledge, proficiency, and engagement of the user community, on average, has decreased.

An unmanned aerial system (UAS) can include a UAV and a UAV controller. In most practical scenarios, only the UAVs are connected over cellular connectivity. The UAS may exchange data traffic with a UAS service supplier (USS) and/or a UAS traffic management (UTM).

A UAV may have an ID associated with it. As matter of fact, is mandatory for some UAVs to have an ID before being airborne. For example, in North America, the Federal Aviation Administration (FAA) is making regulations to make sure all UAVs should have some sort of identifications to be legal to fly, and such identification is called a remote identification (RID) for a drone or UAV.

Not many RID types have been identified by the Civil Aviation Authority (CAA) and all RID MUST be registered to a USS. The USS maintains all direct communications with a UAS and forwards appropriate information to UTM. UTM may have other sources of information on UAS and MAY query USS for more information on a UAS.

RID types can include: (1) An ANSI/CTA-2063-A number. This is assigned by the Manufacturer to the UAS and it is hard-coded into a UAV's hardware. It is used in the UAS registration with the USS. (2) A CAA-level Assigned Registration Number. This registration number is assigned by a local or international CAA and the UAS operator must register this number with a USS. (3) A universally unique identifier (UUID). This number may be created by the UAS manufacturer or created by the USS during registration. In either case, the UAS operator must register this number with a USS. (4) The internet engineer task force (IETF) develops another RID type called DRIP which may also be used for UAS registration to a USS. Whatever RID type has been assigned to a UAS, such RID must be registered to a USS/UTM.

Figure 2:
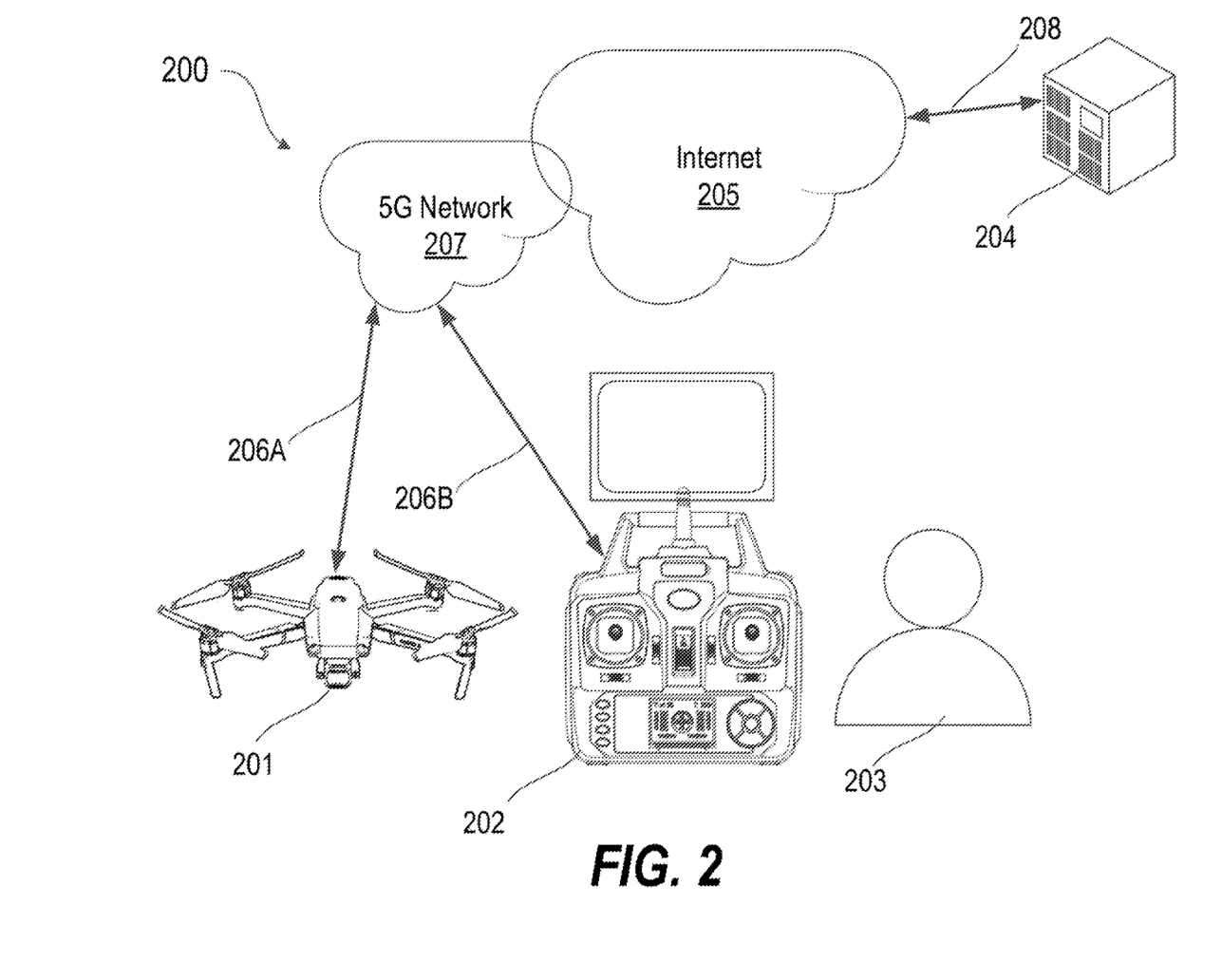
FIG. 2 is a schematic illustration of a UAS that includes UAS communication with at least one server.

FIG. 2 is a schematic illustration of a UAS (200). The UAS (200) may include a UAV (201) and a controller (202). The UAV (201) and the controller (202) may be the same or similar to the UAV (101) and the controller (102) illustrated in FIG. 1, respectively. According to an embodiment, the UAS (200), potentially operated by a human pilot (203), may be configured to inform one or more servers (or USSs) (204) about the position of the UAV (201) in real-time. The reporting can be conducted using the Internet (205). In some embodiments, each of the UAV (201) and the controller (202) of the UAS (200) may configured to have a respective connection ((206A) or (206B)) over a wireless network such as a network (207) (e.g., 5G Network) to the Internet (205), and the server (204) also may have a connection (208) to the Internet (205). Such a scenario may be assumed herein, but embodiments of the present disclosure are not limited thereto. Networks other than the Internet (205) may also be used. For example, conceivably, a closed wireless network that is not the Internet could be used to communicate between the UAS (200) and the server (204). For example, closed wireless networks may be used for certain military UAVs. When referring to the "Internet" henceforth, such networks are meant to be included.

Many physical wireless network technologies may be deployed in uses that enable connections (206) (e.g., wireless connections) and networks (207) (e.g., wireless networks) to connect systems such as the controller (202) or the UAV (201) of the UAS (200) to the Internet (205). For outdoor applications, mobile networks may be used such as, for example, 5th Generation or "5G" networks. Henceforth, the use of such a 5G network may be assumed but embodiments of the present disclosure are not limited thereto. Other physical network technologies can equally be employed, including for example, 3G, 3.5G, 4G, LTE mobile networks, wireless LAN in infrastructure or ad hoc mode, zig-bee, and so on. In embodiments of the present disclosure, a mobile network carrying the Internet can offer bi-directional communication, such as between the UAS (200) and the server (204). The Quality of Service (QoS) in each direction may differ however. According to embodiments of the present disclosure, the UAV (201), the controller (202), and/or the server (204) may include communication interfaces (including for example, communication circuitry such as a transmitter and/or a receiver) and at least one processor (or processing circuitry) with memory that implements one or more of the physical wireless network technologies, so as to be configured to communicate via one or more of the network types of the present disclosure.

With reference to FIG. 2, the connections (206) between the Internet (205) through a network (207) (e.g., a 5G network) to the UAV (201) and/or the controller (202) can be bi-directional. When using Internet protocols such as Internet Protocol (IP), Transmission Control Protocol (TCP), User Datagram Protocol (UDP), Hypertext Transfer Protocol (HTTP), Quick UDP Internet Connections (QUIC), and similar, for the communication between the UAS (200) and the server (204), then by the nature of such protocols, a bi-directional link may be required for those protocols to work.

Figure 3:
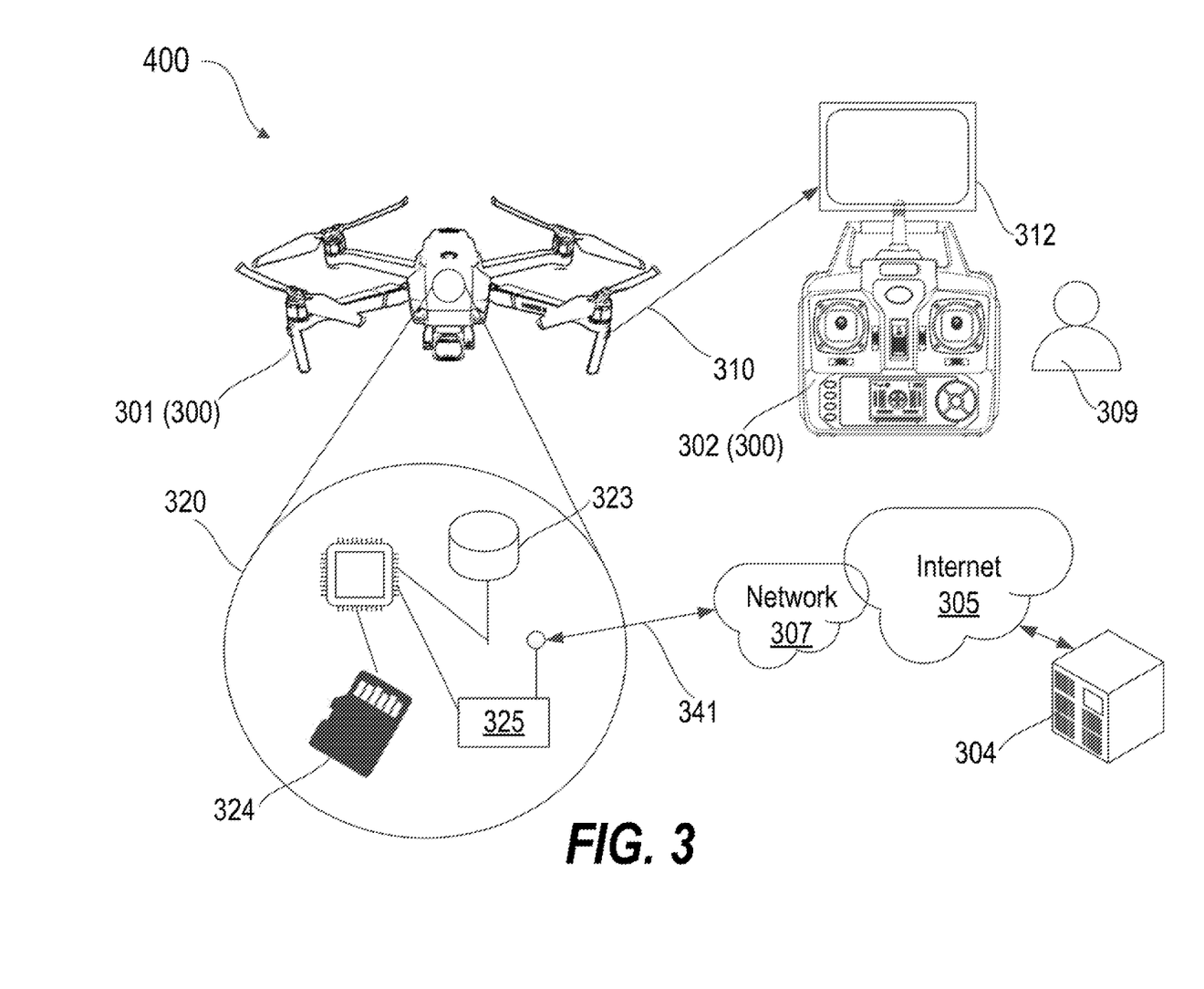
FIG. 3 is a schematic illustration of a system including a UAS in accordance with an embodiment.

In FIG. 3, a system (400) can be provided. The system (400) can include a UAV (301) and a controller (302), that together constitute a UAS (300). In some embodiments, the controller (302) can include a display (312). The UAV (301) and the controller (302) may include any number of the hardware (e.g., cameras and communication interfaces) and software components described with respect to the UAS (100) and the UAS (200) illustrated in FIGS. 1-2, and may be configured to perform the functions described with respect to the UAS (100) and the UAS (200). With reference to FIG. 3, the UAV (301) may include a computer system (320) that includes processing circuitry, such as at least one processor, and memory storing computer code. The computer code can be configured to cause the UAV (301) to perform its functions when executed by the at least one processor of the UAV (301). The computer system (320) may be implemented by any number of the components of computer system (900) described later below with reference to FIG. 9.

The computer system (320) may include a GPS antenna (323) and a GPS receiver (not shown). The GPS antenna (323) together with the GPS receiver can be configured to obtain a location of the UAV (301) in two-dimensional space. The UAV (301) may also include memory storage (324) accessible by the user (309) of the UAV (301). For example, as illustrated in FIG. 3, the memory storage (324) may be a micro-SD card. However, the memory storage (324) could also be another removeable semiconductor storage, onboard NV-RAM in the UAV (301) that is accessible through a network plug from a computer or wireless LAN, and so forth. Computer system (320) may include a communication interface that includes, for example, one or more communicators such as a communicator (325), which may include, for example, a 5G antenna. The communicator (325) may be configured to send data to and receive data (e.g., the information pertaining to the airspace(s)) from the Internet (305) by using the network (307). For example, with reference to FIG. 3, the UAV (301) of the UAS (300) may be configured with a wireless connection (341) over a wireless network such as a network (307) (e.g., a 5G Network) to the Internet (305), and one or more servers (304) may have a connection to the Internet (305). The communicator (325), or another communicator of the communication interface of the UAV (301), may be configured to send data (e.g., sensor data, video data, or the information pertaining to the airspace(s)) to and receive data (e.g., command data) from the controller (302) via a wireless connection (310).

Figure 4:
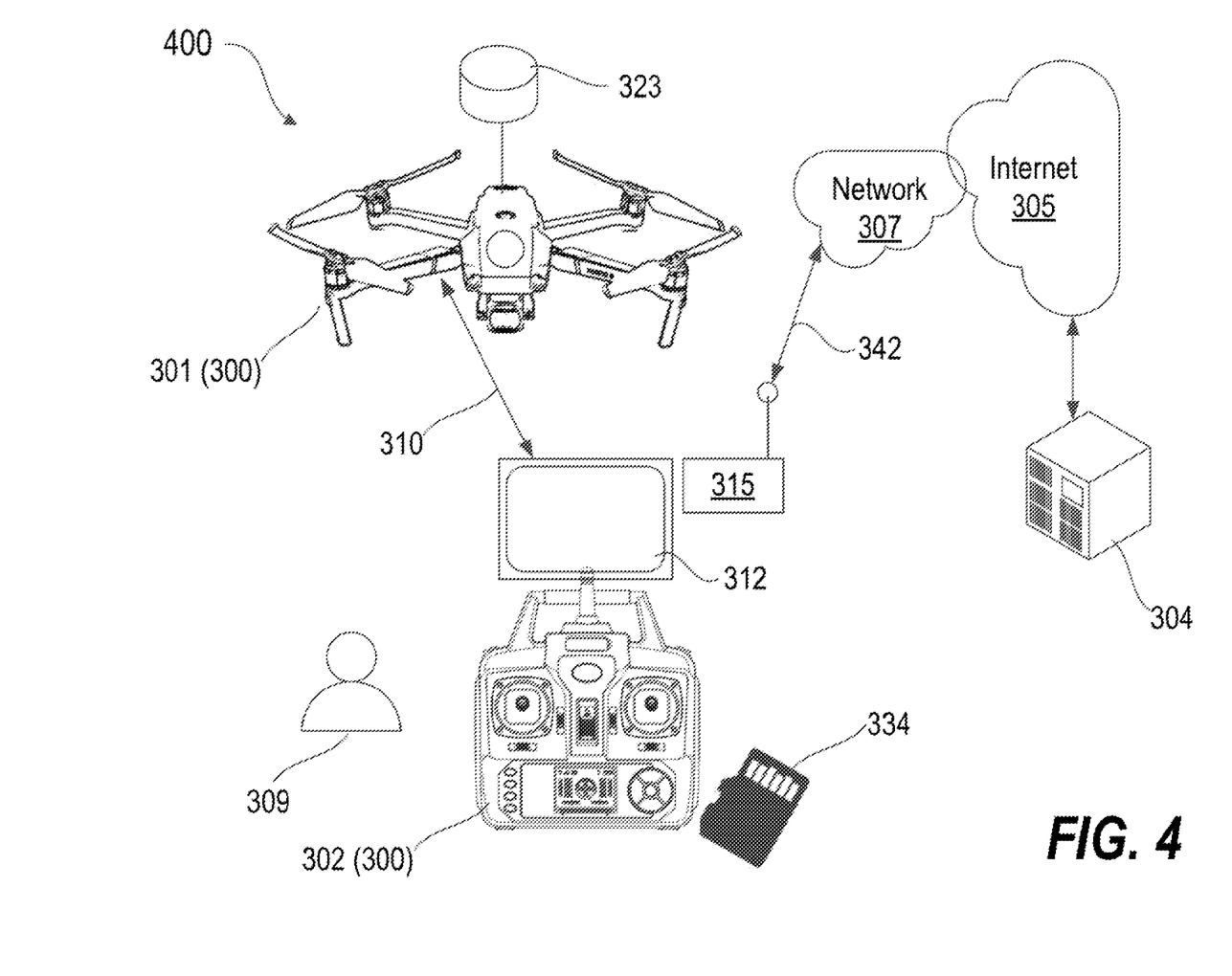
FIG. 4 is a schematic illustration of a system including a UAS in accordance with an embodiment.

With reference to FIG. 4, a communicator (315) of the controller (302), or another communicator of the communication interface of the controller (302), may be configured to send data to and receive data (e.g., the information pertaining to the airspace(s)) from the Internet (305) by using the network (307). Each communicator of the present disclosure may include, for example, a transmitter and a receiver. The controller (302) may include a memory storage (334) accessible by the user (309) of the controller (302). The memory storage (334) may have a same or similar configuration as the memory storage (324). According to embodiments, one, none, or both of the memory storage (324) and the memory storage (334) may be included in the UAS (300).

A 3GPP 5G wireless architecture can include a service enabler architecture layer for verticals (SEAL) which provides procedures, information flows and Application Program Interfaces (APIs) to support vertical applications (e.g., UAV and vehicle to everything (V2X) applications) over a 3GPP system to ensure efficient use and deployment of vertical applications over the 3GPP system. SEAL services can include but not limited to group management, configuration management, location management, identity management, key management, and network resource management.

Figure 5:
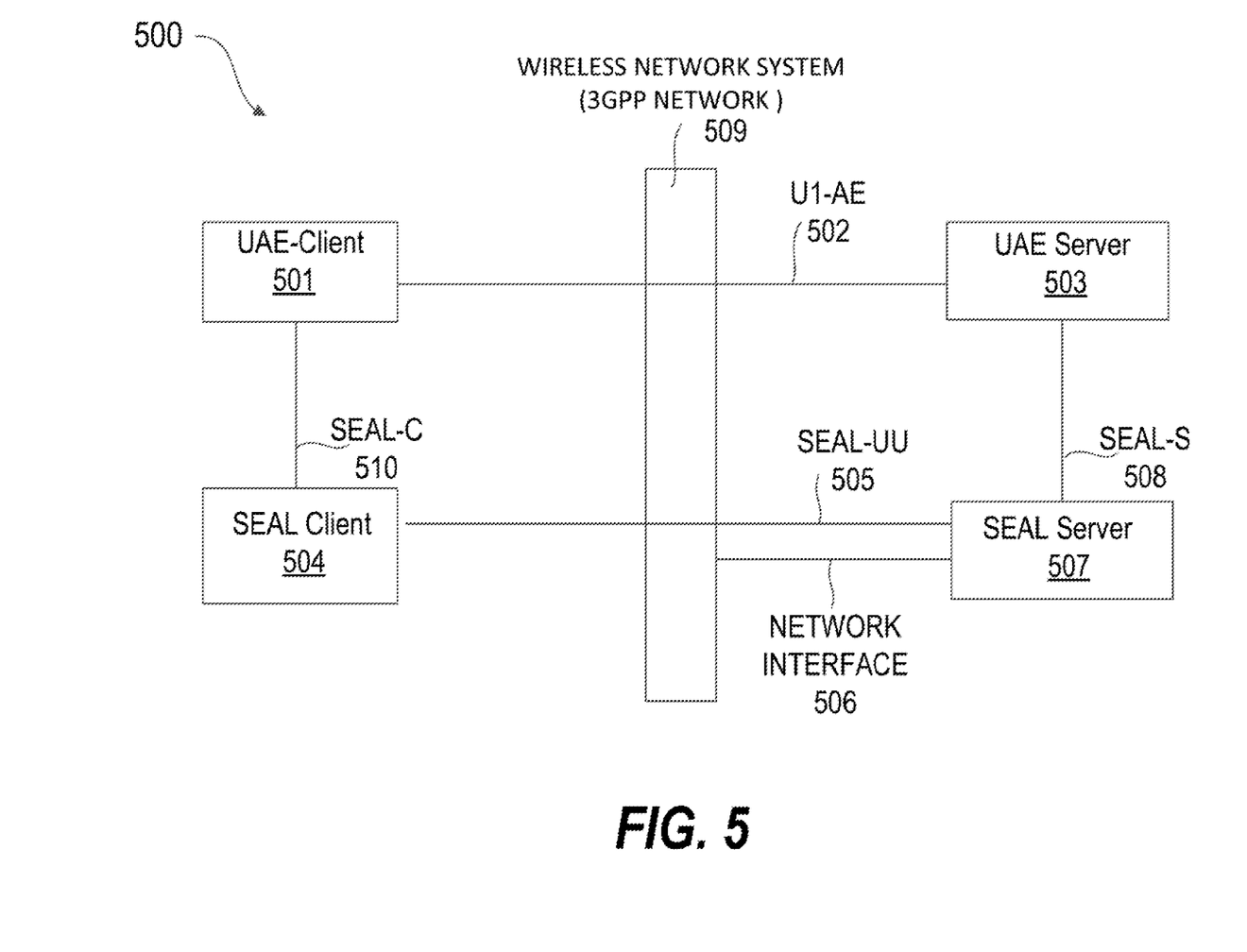
FIG. 5 is an on-network function model (500) for a service enabler architecture layer (SEAL) in accordance with an embodiment.

FIG. 5 shows an exemplary on-network functional model (500) for the SEAL. As shown in FIG. 5, the model (500) can include a UAS application enabler (UAE) layer that offers the UAE capabilities to a UAS application specific layer (not shown). The UAE layer may include a UAE client (501) and a UAE server (503). The UAE client (501) and UAE server (503) communicate with each other through a 3GPP network (509) use a U1-AE (502) reference point.

The underneath SEAL services utilized by the upper UAE layer may include location management, group management, configuration management, identity management, key management, and network resource management.

Still referring to FIG. 5, the SEAL client(s) (504) can communicate with the SEAL server(s) (507) through a 3GPP network (509) over the SEAL-UU (505) reference points. SEAL-UU (505) can support both unicast and multicast delivery modes. The SEAL client(s) (504) provides the service enabler layer support functions to the UAE client(s) (501) over SEAL-C reference points (510). The UAE server(s) (503) communicate with the SEAL server(s) (507) over the SEAL-S (508) reference points. The SEAL server(s) (507) may communicate with the underlying 3GPP core network systems (e.g., the 3GPP network (509)) using the respective 3GPP interfaces (506) specified by the 3GPP network systems.

The reference point of the respective 3GPP interfaces (506) may include but not limited to the functions such as the network resource management server communicates with the 3GPP Policy and Charging Rules Function (PCRF) or the network resource management server communicates with the 3GPP 5G Policy Control Function (PCF) to control the unicast and multicast resources from the underlying 3GPP network system.

The present disclosure includes parameters that can be used to support UAV replacement in a UAS. The replacement can maintain network service continuity by updating the group membership in the UAS.

Figure 6:
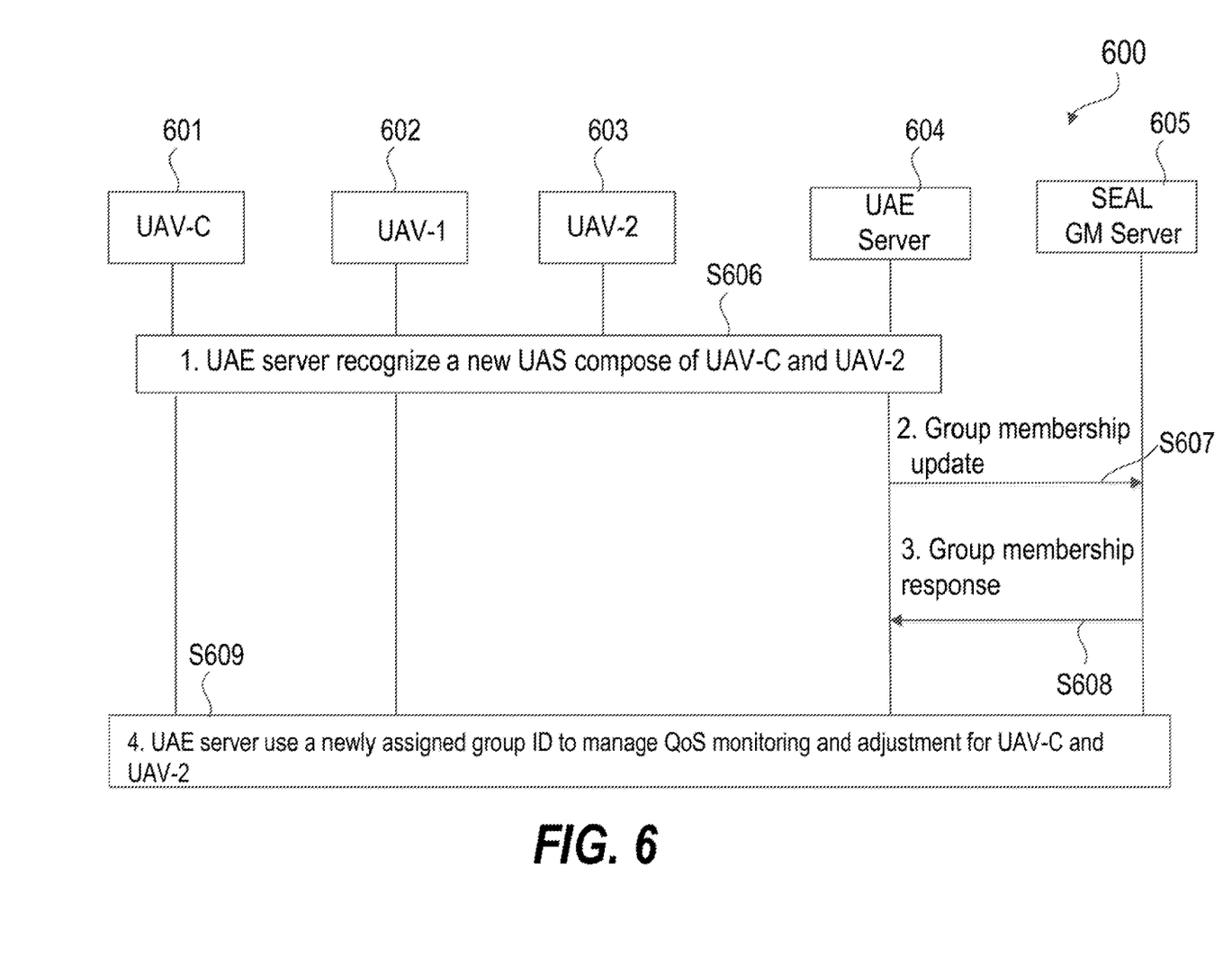
FIG. 6 shows a group membership update process (600) in accordance with an embodiment.

FIG. 6 shows an exemplary procedure (600) of group membership update in a UAS. As shown in FIG. 6, the UAV grouping function can be managed by a SEAL group management (GM) server (605) (also referred to as SEAL group manager (605)) that can enable group management operations for an upper application layer (e.g., the VAL (506) in FIG. 5).

As mentioned above, a UAV identification or a RID can be an important component for a UAS to be considered safe to operate. In some cases, a UAV replacement in a UAS may cause the change of the UAV ID which may cause network and service interruption.

In the 3GPP UAE layer, the UAV ID may be used to request network resources through SEAL.

A 3GPP connected UAV may obtain a 3GPP UE ID when the connection is successful.

Also, a 3GPP connected UAV must register with a USS/UTM per certain regulations with a pre-assigned or dynamically assigned CAA-level UAV ID as mentioned above. Whatever the case is, after the UAV is replaced, a new registration between a UAS and 3GPP network or a UAV to USS/UTM may be needed, which may have an impact on how SEAL provides specific services to a UAS.

When a UAV has been replaced with a new CAA-level ID, a UAV ID registration may take place.

When the following pre-conditions happen at the same time: (1) The UAV-C and UAV-1 has previously successfully subscribed with 3GPP and USS/UTM and received a 3GPP UE ID (e.g., GPSI) and a CAA-level ID; (2) The UAV-2 (a replacement) is also successfully subscribed with 3GPP and USS/UTM, and also received a CAA-level ID; (3) The UAV-1 and UAV-C were previously given a group identifier by SEAL group manager. The UAS application layer needs to take action to ensure a unique group ID for a pair of UAV-C and UAV-2 (the replacement) to maintain network service continuity.

Referring to FIG. 6, the procedure (600) illustrates how to use SEAL GM server (605) to update the group ID for a new pair of UAV and UAV-C when UAV-1 (602) is replaced by UAV-2 (603).

In an example, assume that the pre-conditions mentioned above are satisfied. Thus, the UAV-C and UAV-1 has previously successfully subscribed with 3GPP and USS/UTM and received the 3GPP UE ID (e.g., GPSI) and the CAA-level ID. The UAV-2 (the replacement) has successfully subscribed with 3GPP and USS/UTM, and received the CAA-level ID. The UAV-1 and UAV-C were previously assigned the group identifier by the SEAL group manager. Accordingly, as shown at step (S606) of FIG. 6, after UAV-1(602) is replaced by UAV-2 (603) to form a new UAS that includes the UAV-C (601) and the UAV-2 (603), the UAE server (604) can recognize a UAV replacement based on a new UAV identifier, such as CAA-level UAV ID associated with the UAV-2 (603).

At step (S607), the UAE server (604) can send a group membership update request to the SEAL GM server (605). The following data may be included in the request (607): a 3GPP UE ID, which is the UAV-C UE ID when first connect to 3GPP network, and the new CAA-level ID of UAV-2 (603).

In some embodiments, the UAE server (604) can send a group membership update request to the SEAL GM server (605). In some embodiments, the group membership update request can include the exemplary data points provided in Table 1.

TABLE 1

Data points for group membership update request

| Information element | Status | Description |
| --- | --- | --- |
| Requester Identity | M | The identity of the group management client performing the request. |
| VAL group ID | M | Identity of the VAL group |
| Identity | M | List of identities of the VAL users and VAL UEs affected by this operation |
| Operations | M | Add to or delete from the group |
| VAL service specific information (see NOTE) | O | Placeholder for VAL service specific information |

NOTE:
The details of this information element are specified in VAL service specific specification and are out of scope of the present document.

As shown in Table 1, "M" stands for "Mandatory", and "O" stands for "Optional". The VAL user can be an authorized user, who can use a VAL UE to participate in one or more VAL services. An exemplary VAL user can be the user 113 in FIG. 1. The UEs can be the UAV-1 (602) and UAV-2 (603). The VAL service can be associated with a UAV service or a V2X service. The VAL group can be a pair of UAV and UAV-C, such as the pair of UAV-1 (602) and UAV-C (601).

At step (S608), the SEAL GM server (605) can respond with a new group ID for the UAV-C (601) and the UAV-2 (603), and also indicate whether the group membership update is successly updated or not.

In some embodiments, the SEAL GM server (605) can send a group membership update response. For example, the group membership update response can include the exemplary data points provided in Table 2.

TABLE 2

Data points of group membership update response

| Information element | Status | Description |
| --- | --- | --- |
| VAL group ID | M | Identity of the VAL group |
| Result | M | Indicates the success or failure for the operation |

As shown in Table 2, the VAL group ID can be the new group ID assigned for the UAV-C (601) and the UAV-2 (603). The result can indicate whether the group membership update is successful or not. If the result indicates that the group membership update is successfully processed, the new group ID can be returned to the UAE server (604).

At step (S609), if the group ID is returned successfully to the UAE server (604), the UAE server (604) may use the returned new group ID for QoS management and monitoring between the UAV-C (601) and the new UAV-2 (603).

In the disclosure, to replace a UAV (e.g., UAV-1 (602)) with a new UAV (e.g., UAV-1 (603)), one or more data points shown in Table 3 can be provided from UAE client (e.g., UAV-C (601)) to UAE server (604). For example, the VAL group ID can include the UAE client ID, and the UAV-1 UE ID and UAV-2 UE ID can be included in the list of identities of VAL UEs affected. The CAA-level UAV ID can be included in the list of identities or VAL service specific information. A delete operation can be associated with the UAV to be removed (e.g., UAV-1 UE ID) and the add operation can be associated with the UAV to be added (e.g., UAV-2 UE ID). In another embodiment, the group membership update request may include an additional replacement operation. One or more of the data points of the group membership update can be included in other elements and/or the VAL service specific information in other embodiments.

TABLE 3

Data points from group membership update

| Information element | Status | Description |
| --- | --- | --- |
| UAE client ID | M | The identifier of the UAE client |
| UAV-1 UE ID | M | The Identifier of UAV-1 UE ID |
| UAV-2 UE ID | M | The Identifier of UAV-2 UE ID, which is the replacement of UAV-1 |
| CAA-level UAV ID | M | The new CAA-Level UAV ID associated with UAV-2 |
| Timeout | O | The timeout period when group membership update response is not received. A new request may be sent again after the timeout. |

It should be noted that "M" stands for "Mandatory", and "O" stands for "Optional" in Table 1.

In some embodiments, the data points can be provided at step (607), where the UAE server (604) can send a group membership update request to the SEAL GM server (605). The UAE client in Table 3 can correspond to the UAV-1 (602), the UAV-2 (603), and the UAV-C (601).

The UAE server (604) can send back a response to a UAE client (e.g., UAV-C (601)) to indicate whether the update is successful or not. Date points in Table 4 can be obtained when the UAE server (604) sends back the response to UAE client (e.g., UAV-C (601)).

TABLE 4

Response data points for group membership update

| Information element | Status | Description |
| --- | --- | --- |
| Result | M | The identification of successfulness of group membership update. A new group id may or may not assigned. |

Figure 7:
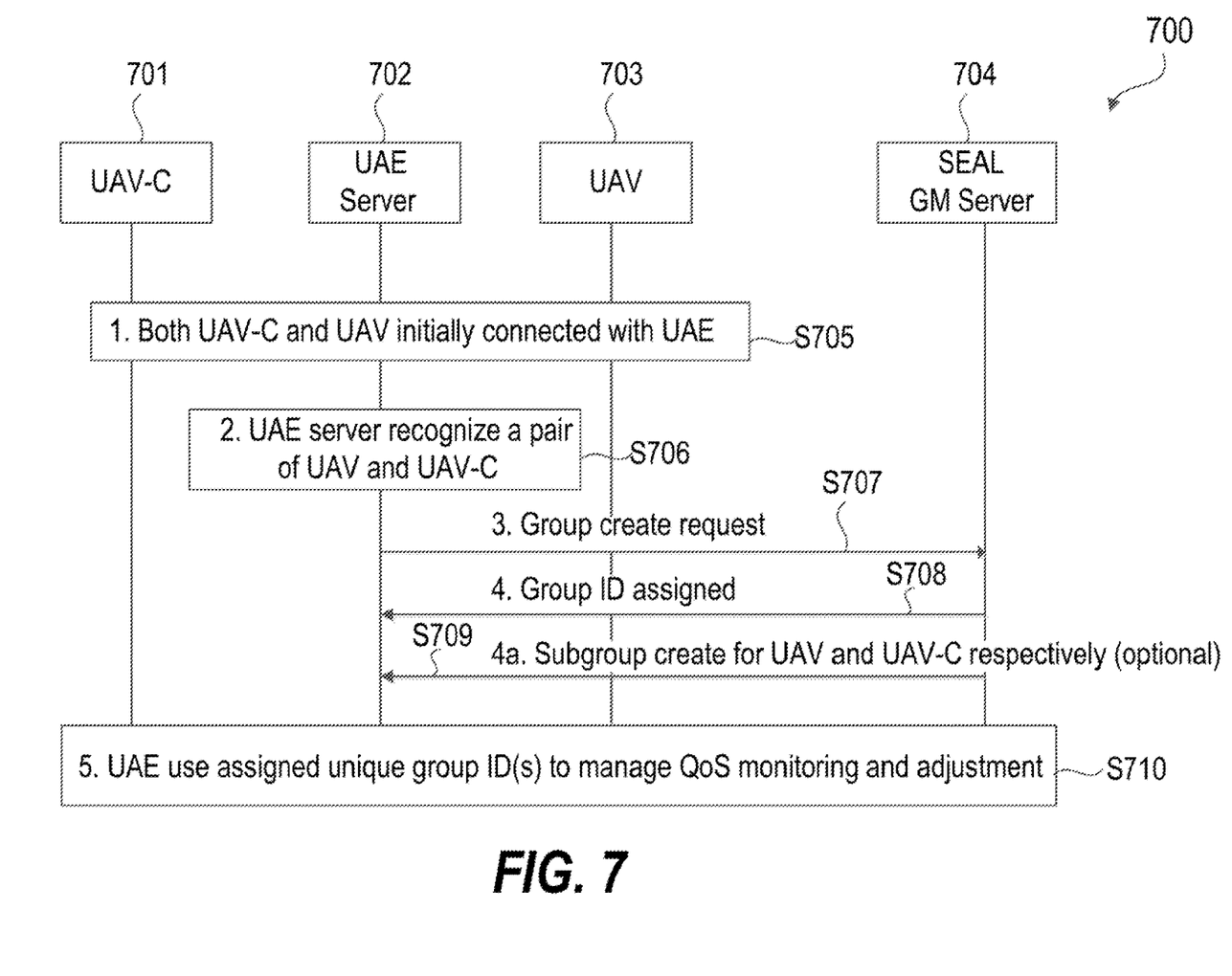
FIG. 7 shows a group creation process (700) in accordance with an embodiment.

Referring to FIG. 7, a procedure (700) of group creation for a pair of UAV and UAV-C can be shown. First of all, at step (S705), both a UAV-C (701) and a UAV (703) may have successfully connected to a UAS Application Enabler (UAE) server (702) with a common UAS ID. In some embodiments, a respective civil aviation authority (CAA)-level UAV ID may have been assigned to the UAV-C (701) and/or the UAV (703). Thus, the UAV-C (701) and/or the UAV (703) can be connected to the UAE server (702) based on the respective CAA-level UAV ID. In some embodiments, the UAV-C (701) and the UAV (703) can act as VAL clients, such as the VAL client (501) in FIG. 5.

At step (706), a UAE server (702) can recognize the pair of UAV (703) and UAV-C (701). For example, The UAE server (702) can recognize the pair of UAV (703) and UAV-C (701) based on a identifier of the pair. For example, the UAE server (702) can recognize the pair of UAV (703) and UAV-C (701) either by a respective 3GPP UE ID or a respective CAA-level UAV ID associated with the UAV-C (701) and the UAV (703). In some embodiments, the UAE server (702) can act as a VAL server, such as the VAL server (503) in FIG. 5.

At step (S707), the UAE server (702) can send a group creation request to a SEAL group management (GM) server (704) using a GM-S reference link. For example, the UAE server (702) can send the group creation request to the SEAL GM server (704), if a group ID has not been assigned for the pair of UAV (703) and UAV-C (701), by using the GM-S reference link. A GM-S reference point can support interactions related to group management functions between VAL server(s) and the group management server. For example, the GM-S reference point supports the VAL server (e.g., UAE server (702)) to obtain group information corresponding to the VAL service (e.g., UAV service). The GM-S reference point can use HTTP-1/HTTP-2 reference points for transport and routing of group management related signaling. The GM-S reference point can use SIP-2 reference point for subscription/notification related signaling. In some embodiments, the SEAL GM server (704) can act as a SEAL server, such as the SEAL server (504) in FIG. 5.

At step (S708), the SEAL GM server (704) may respond to the group creation request and create a group ID for the pair of UAV (703) and UAV-C (701). The SEAL GM server (704) can create one group ID for the pair of UAV (703) and UAV-C (701) in various manners. For example, during the group creation, the group management server creates and stores the information of the group. The group management server performs the check on the policies, such as a maximum limit of the total number of VAL group members for the VAL group(s). The external group identifier, identifying the member UEs of the VAL group at the 3GPP core network, can be stored in the newly created VAL group's configuration information. Further, the group ID can be returned to the UAE server (702). The group ID for the pair of UAV (703) and UAV-C (701) can act as a VAL group ID. The VAL group ID can be a unique identifier within the VAL service (e.g., UAV) that represents a set of VAL users or VAL UE according to the VAL service. The set of VAL users may belong to the same or different VAL service providers. The VAL group ID can indicate a VAL application server (e.g., the UAE server) where the group is defined.

At step (S709), in some cases, subgroups may also be created by the SEAL GM server (704) for the UAV (703) and the UAV-C (701) respectively.

At (S710), the UAE server (702) may use the returned group ID(s), such as the group ID created for the pair of UAV (703) and UAV-C (701) by the SEAL GM server (704), for QoS management. In response to the subgroups being created for the UAV (703) and the UAV-C (701), the UAE server (702) may use subgroup ID(s) to manage QoS for the UAV (703) and the UAV-C (701) separately. QoS can refer to any technology that manages data traffic to reduce packet loss, latency, and/or jitter on a network. QoS can control and manage network resources by setting priorities for specific types of data on the network.

Figure 8:
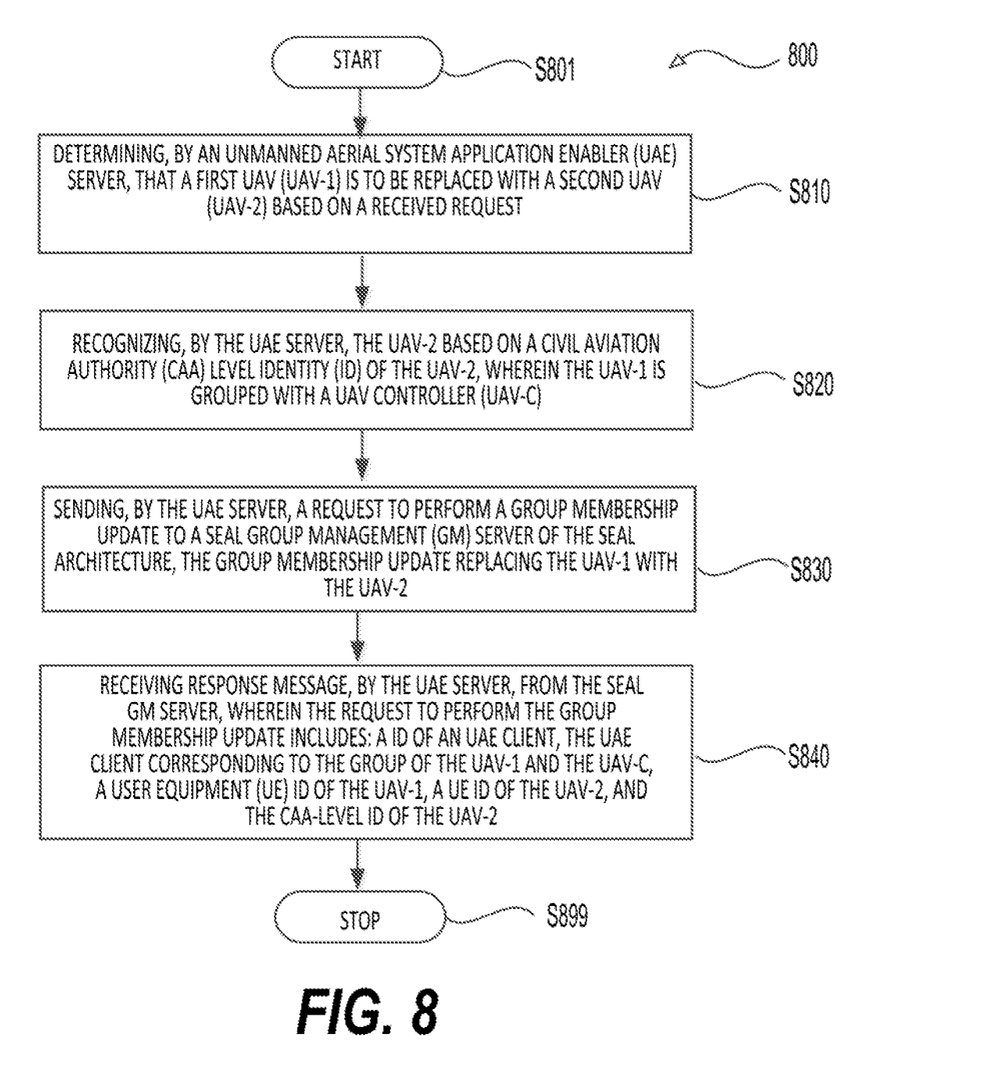
FIG. 8 shows a flow chart outlining a process of group membership update according to some embodiments of the disclosure.

FIG. 8 shows an exemplary process (800) of group membership update. As shown in FIG. 8, the process (800) can start from (S801) and proceed to (S810). At (S810), a UAE server can determine that a first UAV (UAV-1) is to be replaced with a second UAV (UAV-2) based on a received request.

At (S820), the UAV-2 can be recognized by the UAE server based on a Civil Aviation Authority (CAA) level identity (ID) of the UAV-2, where the UAV-1 can be grouped with a UAV controller (UAV-C).

At (S830), a request to perform a group membership update can be sent by the UAE server to a SEAL group management (GM) server of the SEAL architecture. The group membership update can replace the UAV-1 with the UAV-2. The request to perform the group membership update can include (i) an ID of an UAE client, where the UAE client can correspond to the group of the UAV-1 and the UAV-C, (ii) a user equipment (UE) ID of the UAV-1, (iii) a UE ID of the UAV-2, and (iv) the CAA-level ID of the UAV-2.

At (S840), a response message can further be received by the UAE server from the SEAL GM server.

In some embodiments, the request to perform the group membership update further can include a timeout period that defines a waiting time limit for the response message from the SEAL GM server.

In the process (800), another request to perform the group membership update can be transmitted by the UAE server to the SEAL GM server when the response message is not received within the timeout period.

In some embodiments, the response message can include a group membership update result that indicates whether the group is successfully updated to include the UAV-2 and the UAV-C.

In the process (800), based on the group being successfully updated to include the UAV-2 and the UAV-C, an updated group ID for the UAV-2 and the UAV-C can be received by the UAE server from the SEAL GM server.

In some embodiments, the UAV-1 and the UAV-C can be assigned with an initial group ID by the SEAL GM server before the UAV-1 is replaced by the UAV-2.

In the process (800), QoS management can be performed by the UAE server for the UAV-2 and UAV-C based on the updated group ID.

In some embodiments, the UAV-C, the UAV-1, and the UAV-2 can be registered with a 3rd Generation Partnership Project (3GPP) network, where the UE ID of the UAV-1 can include a first 3GPP UE ID, and the UE ID of the UAV-2 can include a second 3GPP UE ID.

In some embodiments, the request to perform the group membership update further can include a 3GPP UE ID of the UAV-C.

The techniques for Unmanned Aerial System Communication, described above, can be implemented in both a controller and a UAV as computer software using computer-readable instructions and physically stored in one or more computer-readable media, such as one or more non-transitory computer-readable storage mediums. For example, FIG. 9 shows a computer system 900 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by processing circuitry such as one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
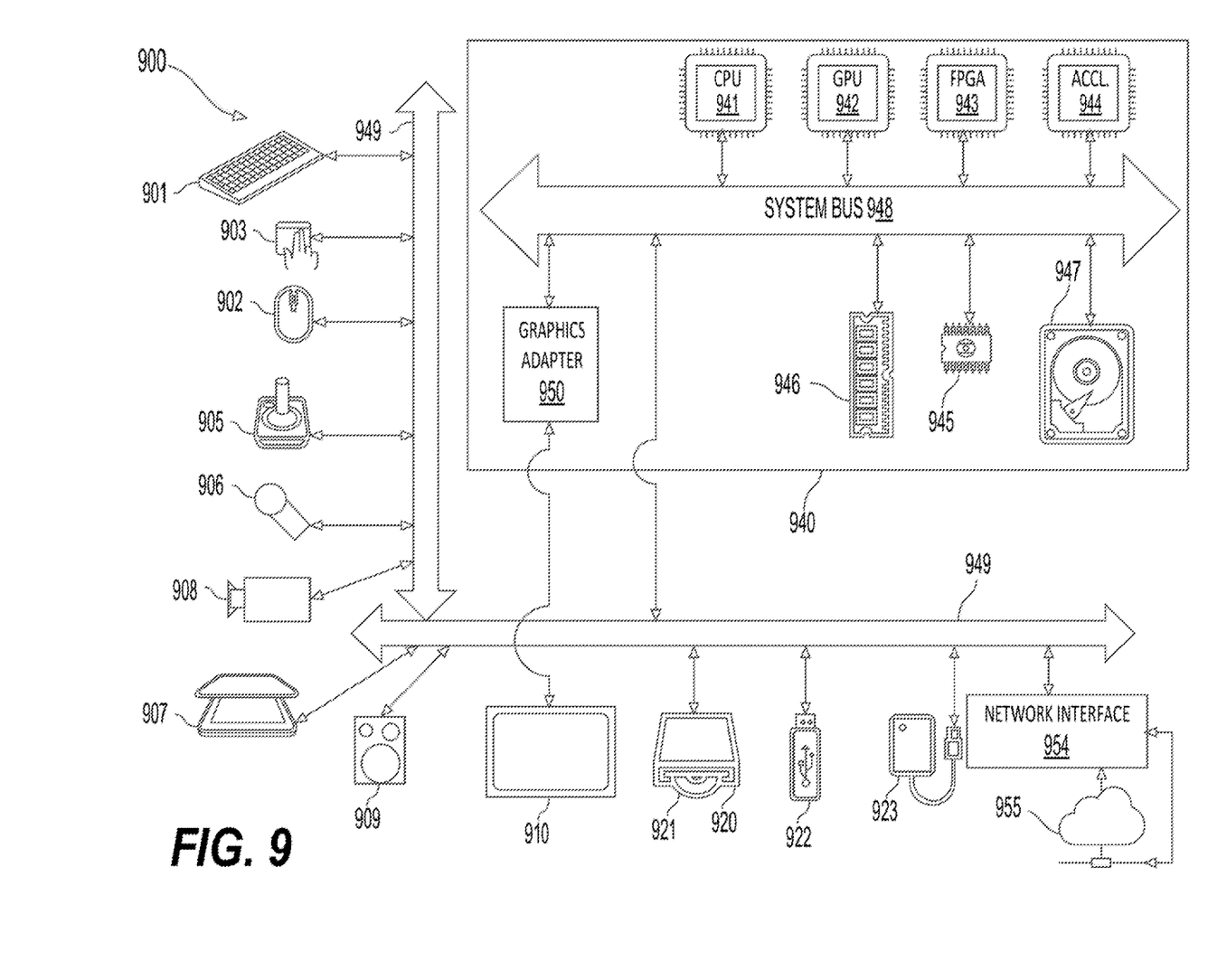
FIG. 9 is a schematic illustration of a computer system in accordance with an embodiment.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), graphics adapters (950), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the screen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of unmanned aerial vehicle (UAV) replacement in a service enabler architecture layer (SEAL) architecture, the method comprising:
   determining, by an unmanned aerial system application enabler (UAE) server, that a first UAV (UAV-1) is to be replaced with a second UAV (UAV-2) based on a received request;
   recognizing, by the UAE server, the UAV-2 based on a Civil Aviation Authority (CAA) level identity (ID) of the UAV-2, wherein the UAV-1 is grouped with a UAV controller (UAV-C);
   sending, by the UAE server, a request to perform a group membership update to a SEAL group management (GM) server of the SEAL architecture, the group membership update replacing the UAV-1 with the UAV-2;
   receiving a response message, by the UAE server, from the SEAL GM server; and
   controlling a flight of at least one of the UAV-1 and the UAV-2 in response to the response message,
   wherein the request to perform the group membership update references a pre-defined set of elements, the pre-defined set of elements consisting of just:
   a mandatory "UAE client ID element" indicating an ID of an UAE client,
   a mandatory "UAV-1 UE ID element" indicating an ID of the UAV-1,
   a mandatory "UAVE-2 UE ID element" indicating an ID of the UAV-2, a mandatory "CAA-level UAV ID element" indicating a new CAA-level UAV ID associated with the UAV-2, and a "timeout" element indicating a timeout period when group membership update response is not received.

2. The method of claim 1, wherein the timeout period defines a waiting time limit for the response message from the SEAL GM server.

3. The method of claim 2, further comprising:
transmitting another request to perform the group membership update by the UAE server to the SEAL GM server when the response message is not received within the timeout period.

4. The method of claim 1, wherein the response message includes a group membership update result that indicates whether the group is successfully updated to include the UAV-2 and the UAV-C.

5. The method of claim 4, further comprising:
based on the group being successfully updated to include the UAV-2 and the UAV-C, receiving, by the UAE server, an updated group ID for the UAV-2 and the UAV-C from the SEAL GM server.

6. The method of claim 5, further comprising:
performing, by the UAE server, Quality of service (QoS) management for the UAV-2 and UAV-C based on the updated group ID.

7. The method of claim 1, wherein the UAV-1 and the UAV-C are assigned with an initial group ID by the SEAL GM server before the UAV-1 is replaced by the UAV-2.

8. The method of claim 1, wherein:
the UAV-C, the UAV-1, and the UAV-2 are registered with a 3rd Generation Partnership Project (3GPP) network,
the UE ID of the UAV-1 includes a first 3GPP UE ID, and
the UE ID of the UAV-2 includes a second 3GPP UE ID.

9. The method of claim 8, wherein the request to perform the group membership update further includes a 3GPP UE ID of the UAV-C.

10. An apparatus, comprising:
processing circuitry configured to:
determine that a first UAV (UAV-1) is to be replaced with a second UAV (UAV-2) based on a received request;
recognize the UAV-2 based on a Civil Aviation Authority (CAA) level identity (ID) of the UAV-2, wherein the UAV-1 is grouped with a UAV controller (UAV-C);
send a request to perform a group membership update to a service enabler architecture layer (SEAL) group management (GM) server of a SEAL architecture, the group membership update replacing the UAV-1 with the UAV-2;
receive a response message from the SEAL GM server; and
control a flight of at least one of the UAV-1 and the UAV-2 in response to the response message,
wherein the request to perform the group membership update references a pre-defined set of elements, the pre-defined set of elements consisting of just:
a mandatory "UAE client ID element" indicating an ID of an UAE client,
a mandatory "UAV-1 UE ID element" indicating an ID of the UAV-1,
a mandatory "UAVE-2 UE ID element" indicating an ID of the UAV-2,
a mandatory "CAA-level UAV ID element" indicating a new CAA-level UAV ID associated with the UAV-2, and
a "timeout" element indicating a timeout period when group membership update response is not received.

11. The apparatus of claim 10, wherein the timeout period defines a waiting time limit for the response message from the SEAL GM server.

12. The apparatus of claim 11, wherein the processing circuitry configured to:
transmit another request to perform the group membership update to the SEAL GM server when the response message is not received within the timeout period.

13. The apparatus of claim 10, wherein the response message includes a group membership update result that indicates whether the group is successfully updated to include the UAV-2 and the UAV-C.

14. The apparatus of claim 13, wherein the processing circuitry configured to:
based on the group being successfully updated to include the UAV-2 and the UAV-C, receive an updated group ID for the UAV-2 and the UAV-C from the SEAL GM server.

15. The apparatus of claim 14, wherein the processing circuitry configured to:
perform Quality of service (QoS) management for the UAV-2 and UAV-C based on the updated group ID.

16. The apparatus of claim 10, wherein the UAV-1 and the UAV-C are assigned with an initial group ID by the SEAL GM server before the UAV-1 is replaced by the UAV-2.

17. The apparatus of claim 10, wherein:
the UAV-C, the UAV-1, and the UAV-2 are registered with a 3rd Generation Partnership Project (3GPP) network,
the UE ID of the UAV-1 includes a first 3GPP UE ID, and
the UE ID of the UAV-2 includes a second 3GPP UE ID.

18. The apparatus of claim 17, wherein the request to perform the group membership update further includes a 3GPP UE ID of the UAV-C.

19. A non-transitory computer readable storage medium storing instructions which when executed by at least one processor of an unmanned aerial system application enabler (UAE) server cause the at least one processor to perform:
determining that a first UAV (UAV-1) is to be replaced with a second UAV (UAV-2) based on a received request;
recognizing the UAV-2 based on a Civil Aviation Authority (CAA) level identity (ID) of the UAV-2, wherein the UAV-1 is grouped with a UAV controller (UAV-C);
sending a request to perform a group membership update to a service enabler architecture layer (SEAL) group management (GM) server of a SEAL architecture, the group membership update replacing the UAV-1 with the UAV-2;
receiving a response message from the SEAL GM server; and
controlling a flight of at least one of the UAV-1 and the UAV-2 in response to the response message,
wherein the request to perform the group membership update references a pre-defined set of elements, the pre-defined set of elements consisting of just:
a mandatory "UAE client ID element" indicating an ID of an UAE client,
a mandatory "UAV-1 UE ID element" indicating an ID of the UAV-1,
a mandatory "UAVE-2 UE ID element" indicating an ID of the UAV-2,
a mandatory "CAA-level UAV ID element" indicating a new CAA-level UAV ID associated with the UAV-2, and
a "timeout" element indicating a timeout period when group membership update response is not received.

20. The non-transitory computer readable storage medium according to claim 19, wherein the timeout period defines a waiting time limit for the response message from the SEAL GM server.

* * * * *